(12) United States Patent  
Schofalvi et al.

(10) Patent No.: US 9,272,954 B2
(45) Date of Patent: Mar. 1, 2016

(54) COMPOSITION USEFUL AS MORTAR OR COATINGS REFRACTORIES

(75) Inventors: Karl-Heinz Schofalvi, Solon, OH (US); Evelyn McGee DeLiso, Corning, NY (US)

(73) Assignee: Capacity Holdings LLC, Cleveland, OH (US)

( * ) Notice: Subject to any disclaimer, the term of this patent is extended or adjusted under 35 U.S.C. 154(b) by 1069 days.

(21) Appl. No.: 13/390,382

(22) PCT Filed: Jul. 21, 2010

(86) PCT No.: PCT/US2010/042677
§ 371 (c)(1),
(2), (4) Date: Jul. 12, 2012

(87) PCT Pub. No.: WO2011/011470
PCT Pub. Date: Jan. 27, 2011

(65) Prior Publication Data
US 2012/0267812 A1    Oct. 25, 2012

Related U.S. Application Data

(60) Provisional application No. 61/228,288, filed on Jul. 24, 2009.

(51) Int. Cl.
*F27D 1/16* (2006.01)
*C04B 35/66* (2006.01)
(Continued)

(52) U.S. Cl.
CPC ............... *C04B 35/101* (2013.01); *B22C 1/18* (2013.01); *B22C 3/00* (2013.01); *C04B 28/06* (2013.01); *C04B 28/34* (2013.01); *C04B 35/6263* (2013.01); *C04B 35/62635* (2013.01); *C04B 35/62685* (2013.01); *C04B 35/6303* (2013.01); *C04B 35/6309* (2013.01); *C04B 35/803* (2013.01); *C21B 7/04* (2013.01); *C21C 5/44* (2013.01); *F27D 1/0006* (2013.01); *C04B 2111/00431* (2013.01);
(Continued)

(58) Field of Classification Search
None
See application file for complete search history.

(56) References Cited

U.S. PATENT DOCUMENTS

| 3,899,444 A | 8/1975 | Stephens ................. 252/455 |
| 3,982,955 A | 9/1976 | Mansmann et al. ........ 106/307 |

(Continued)

FOREIGN PATENT DOCUMENTS

| EP | 0598414 | 5/1994 |
| WO | 2009148667 | 12/2009 |

OTHER PUBLICATIONS

Glaskow et al.; "The Variety of Phosphates for Refractory and Technical Applications by the Example of Aluminum Phosphates"; CFI/BER. DKG 81, No. 5; Jan. 1, 2004; pp. E-27-E32.

(Continued)

*Primary Examiner* — Yogendra Gupta
*Assistant Examiner* — Kimberly A Stewart
(74) *Attorney, Agent, or Firm* — McDonald Hopkins LLC

(57) ABSTRACT

This invention relates to a composition comprising: ceramic refractory particulates made from alumina, one or more rare earth oxides, one or more oxides of a transition metal, the transition metal being Sc, Zn, Ga, Y, Cd, In, Sn, Tl, or a mixture of two or more thereof; an alumina and phosphate containing composition; and water. The composition is free of $SiO_2$ or substantially free of $SiO_2$, and is useful as a mortar or coating for molten aluminum or steel contact refractories.

24 Claims, 2 Drawing Sheets

(51) Int. Cl.

| | | |
|---|---|---|
| *C04B 35/101* | (2006.01) | |
| *C04B 35/63* | (2006.01) | |
| *C04B 35/626* | (2006.01) | |
| *C04B 35/80* | (2006.01) | |
| *B22C 1/18* | (2006.01) | |
| *B22C 3/00* | (2006.01) | |
| *C04B 28/06* | (2006.01) | |
| *C04B 28/34* | (2006.01) | |
| *C21B 7/04* | (2006.01) | |
| *C21C 5/44* | (2006.01) | |
| *F27D 1/00* | (2006.01) | |
| *C04B 111/00* | (2006.01) | |

(52) U.S. Cl.
CPC .............. *C04B 2111/00482* (2013.01); *C04B 2235/322* (2013.01); *C04B 2235/3218* (2013.01); *C04B 2235/3224* (2013.01); *C04B 2235/3225* (2013.01); *C04B 2235/3227* (2013.01); *C04B 2235/3229* (2013.01); *C04B 2235/3284* (2013.01); *C04B 2235/3286* (2013.01); *C04B 2235/3293* (2013.01); *C04B 2235/526* (2013.01); *C04B 2235/5224* (2013.01); *C04B 2235/5264* (2013.01); *C04B 2235/5409* (2013.01); *C04B 2235/5427* (2013.01); *C04B 2235/5436* (2013.01); *C04B 2235/5445* (2013.01); *C04B 2235/5472* (2013.01); *C04B 2235/606* (2013.01); *C04B 2235/6562* (2013.01); *C04B 2235/6565* (2013.01); *C04B 2235/6567* (2013.01); *C04B 2235/72* (2013.01); *C04B 2235/96* (2013.01); *C04B 2235/9676* (2013.01)

(56) References Cited

U.S. PATENT DOCUMENTS

| | | | |
|---|---|---|---|
| 3,993,572 A | 11/1976 | Hindin et al. | 252/462 |
| 4,528,279 A | 7/1985 | Suzuki et al. | 502/200 |
| 4,837,230 A | 6/1989 | Chen et al. | 501/88 |
| 4,839,402 A | 6/1989 | Stevens | 523/200 |
| 4,935,296 A | 6/1990 | Stevens | 428/381 |
| 5,006,423 A | 4/1991 | Draskovich | 428/698 |
| 5,126,087 A | 6/1992 | Lespade et al. | 264/136 |
| 5,155,070 A * | 10/1992 | Skorupa | 501/103 |
| 5,260,241 A * | 11/1993 | Addiego et al. | 502/60 |
| 5,294,387 A | 3/1994 | Nakano et al. | 156/89.26 |
| 5,340,655 A | 8/1994 | Creber et al. | 428/446 |
| 5,378,665 A | 1/1995 | Chen et al. | 501/95.1 |
| 5,422,331 A | 6/1995 | Galligan et al. | 502/333 |
| 5,488,017 A | 1/1996 | Szweda et al. | 501/95.2 |
| 5,490,977 A | 2/1996 | Wan et al. | 423/210 |
| 5,609,741 A | 3/1997 | Illston et al. | 204/471 |
| 5,635,454 A | 6/1997 | Baker et al. | 595/434 |
| 5,656,217 A | 8/1997 | Rogers et al. | 264/640 |
| 6,030,910 A | 2/2000 | Zoitos et al. | 501/36 |
| 6,497,776 B1 | 12/2002 | Butler et al. | 156/89.11 |
| 7,081,294 B2 | 7/2006 | Schofalvi et al. | 428/325 |
| 7,488,544 B2 | 2/2009 | Schofalvi et al. | 428/701 |
| 2003/0022783 A1 | 1/2003 | DiChiara | 501/127 |

OTHER PUBLICATIONS

"3.2 Binders: 3.3 Special Additives"; In: Gerland Routschka, Hatmut Wuthnow: "Pocket Manual Refractory Materials; 3rd Edition"; May 14, 2008, Vulkan Verlag, Essen, DE, XP-002601985; ISBN: 978-3-8027-315807; pp. 45-47; Chapter 3.2 and 3.3 Table 3.2.

Internal Search Report and Written Opinion; Application No. PCT/US2010/042677; mailed Oct. 12, 2010.

International Preliminary Report on Patentability; Application No. PCT/US2010/042677; issued Jan. 24, 2012.

U.S. Appl. No. 12/508,662, filed Jul. 24, 2009.

U.S. Appl. No. 12/399,510, filed Mar. 6, 2009.

Claussen, N. and G. Petzow, Whisker-reinforced zirconia-toughened ceramics. Tressler, Messing, Pantano & Newnham, Eds. Tailoring of Multiphase and Composite. (pp. 649-662). Plenum Publishing Corp., 1986.

Mazdiyasni, K.S. Fiber Reinforced Ceramic Composites. (pp. 1-39, 93-109, 122-140, 182-192, 328-341, and 434). William Andrew Publishing/Noyes, 1990. Online version available at: http://www.knovel.com/knovel2/Toc.jsp?BookID=364&VerticalID=0.

Almatis Premium Alumina; "Cements & Binders"; www.almatis.com/refractor/applications/cements-and-binders.aspx; Nov. 15, 2007.

Almatis Premium Alumina; Data Sheets & MSDS; www.almatis.com/data-sheets. Nov. 15, 2007.

Almatis Premium Alumina; Alphabond 300 Material Safety Data Sheet; May 31, 2007; pp. 1-6.

3M; "3M™ Nextel™ Ceramic Fiber," Product Literature; www.3m.com/product/information/Nextel-Ceramic-Fiber.html; Nov. 15, 2007.

3M; Nextel™, Ceramic Textiles Technical Notebook, pp. 1-47. (Publication Date Unknown but Admitted as Prior Art).

Buhr et al.; "Almatis Global Product Concept for the Refractory Industry"; (Publication Date Unknown but Admitted as Prior Art).

McConnell et al.; "Raw Materials for Non-Complex High Performance Low Cement Castables"; (Publication Date Unknown but Admitted as Prior Art).

Hurley et al.; "Subtask 6.4—Improved Corrosion Resistance for Alumina Refractory"; Final Topical Report for the period Apr. 15, 1998 through Apr. 30, 1999; Apr. 1999.

Wilson et al.; "High Performance Oxide Fibers for Metal and Ceramic"; Presented at the Processing of Fibers & Composites Conference, Barga, Italy, May 22, 2000.

\* cited by examiner

COMPOSITION USEFUL AS MORTAR OR COATINGS REFRACTORIES

TECHNICAL FIELD

This invention relates to compositions which are useful as mortar or coatings for refractories.

BACKGROUND

The high temperatures experienced with molten metals in the aluminum and steel industries typically require the use of refractories that are placed in contact with the molten metals.

SUMMARY

This invention relates to a composition, comprising: ceramic refractory particulates made from an as-batched refractory composition which comprises alumina particulates, one or more rare earth oxides, and one or more oxides of a transition metal, the transition metal being Sc, Zn, Ga, Y, Cd, In, Sn, Tl, or a mixture of two or more thereof, the as-batched refractory composition being fired to form a ceramic refractory; a phosphate and alumina containing composition; and water; the composition being free of $SiO_2$ or substantially free of $SiO_2$. The as-batched refractory composition used for making the ceramic refractory particulates may further comprise chopped ceramic fibers containing nanofibrils, alumina fibers, or a mixture thereof.

These compositions are useful as mortar or coating compositions for treating refractories used for contacting molten metals such as aluminum and steel.

This invention relates to a process for treating a refractory comprising applying one of the foregoing compositions to a refractory, curing the composition, and then firing the cured composition. When the refractory is used for contacting molten aluminum, the cured composition may be fired at a temperature up to about 815° C. When the refractory is used for contacting molten steel, the cured composition may be fired at a temperature up to about 1700° C.

DETAILED DESCRIPTION

Figure 1:
FIG. 1 is a photograph of a brick sample used in the 72 Hour Mortar Cup Test described in Example 14.

All ranges and ratio limits disclosed in the specification and claims may be combined in any manner. It is to be understood that unless specifically stated otherwise, references to "a", "an", and/or "the" may include one or more than one, and that reference to an item in the singular may also include the item in the plural.

The term "substantially free of $SiO_2$" refers to a concentration of $SiO_2$ of no more than about 0.2% by weight, and in one embodiment no more than about 0.15% by weight, and in one embodiment no moe than about 0.1% by weight, and in one embodiment no more than about 0.08% by weight, and in one embodiment no more than about 0.05% by weight, and in one embodiment no more than about 0.02% by weight, and in one embodiment no more than about 0.01% by weight, and in one embodiment no more than about 0.005% by weight.

The term "chopped ceramic fiber" refers to short lengths of ceramic fiber made by cutting a continuous ceramic fiber roving. The chopped fibers may be uniform in length and diameter. The lengths may be in the range from about 0.1 to about 5 cm, and in one embodiment from about 0.3 to about 4 cm. The diameters may be in the range from about 1 to about 50 microns, and in one embodiment from about 1 to about 30 microns, and in one embodiment from about 1 to about 20 microns, and in one embodiment from about 3 to about 15 microns, and in one embodiment from about 7 to about 13 microns, and in one embodiment about 10 microns.

The term "nanofibril" refers to fibrils extending from the surface of the chopped ceramic fibers. The nanofibrils may have mean diameters in the range from about 0.1 to about 2000 nanometers (nm), and in one embodiment in the range from about 1 to about 1000 nm, and in one embodiment in the range from about 5 to about 500 nm, and in one embodiment in the range from about 10 to about 100 nm. The nanofibrils may have mean lengths in the range from about 1 to about 10,000 nm, and in one embodiment in the range from about 10 to about 5000 nm, and in one embodiment in the range from about 50 to about 2500 nm, and in one embodiment in the range from about 100 to about 1000 nm.

Processes for making metals such as aluminum and steel typically involve process steps wherein large bodies or molten metal are held in furnaces or crucibles lined with refractories. Refractories, which may also be referred to as ceramics, are materials that resist melting at high temperatures. Refractories may be made of various oxide materials. Refractory linings for the aluminum and steel industries are typically evaluated based on the lifetime of the refractory lining. In the case of ladles and their refractory linings the evaluation may be made based upon the number of heats of the ladle refractory. The longer the ladle refractory lining survives, the more it is cost effective. This invention provides for mortar and coating compositions that can be applied to these refractory linings to extend their lifetimes. These coatings may be used to repair refractories that have been used in metal processing operations as well as to coat new refractories that have not yet been placed in service. The mortar may be used to fill cracks in these refractories as well as to fill gaps between the refractories.

Molten aluminum metal is a strong reducer of oxide materials. A strong chemical driving force exists for molten aluminum to oxidize. This driving force may be thermodynamically characterized by the Gibbs Free Energy of Formation or ΔG. The more negative the ΔG, the stronger the driving force. The Gibbs Free Energy of Formation numbers for the reduction of silica and mullite along with their reactions with aluminum are shown below:

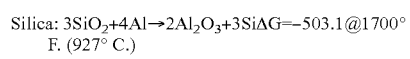

Silica: $3SiO_2 + 4Al \rightarrow 2Al_2O_3 + 3Si \Delta G = -503.1$ @ 1700° F. (927° C.)

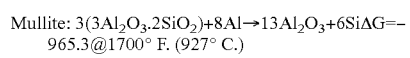

Mullite: $3(3Al_2O_3 \cdot 2SiO_2) + 8Al \rightarrow 13Al_2O_3 + 6Si \Delta G = -965.3$ @ 1700° F. (927° C.)

A problem with using a refractory containing silica in contact with molten aluminum is that silicon from the refractory tends to transfer to the molten aluminum. As silicon is often one of the elemental additions to many aluminum alloys, it is undesirable for the silicon concentration in the aluminum metal to increase as a result of contact with the aluminum contact refractory. This invention provides a solution to this problem. With the present invention, the mortar and coating compositions that are applied to the refractories are free of $SiO_2$ or substantially free of $SiO_2$. These mortar and coating compositions may be non-reactive or substantially non-reactive with molten aluminum.

Another problem resulting from the reduction of $SiO_2$ by molten aluminum is that alumina or corundum is often formed. At the air-metal-refractory interface the formation of corundum often creates bulbous-shaped black growths which attach themselves to the refractory surface. As the reduction of $SiO_2$ and formation of alumina occurs at the interface of the molten metal and the refractory, the front of the reaction pathway often penetrates into the refractory wall via capillary infiltration. These reaction fronts proceed into the refractory wall and cause the bulbous shaped black growths to adhere in the refractory wall. As part of standard reverbatory or crucible furnace operations, the metal surface may be skimmed with a tool, and a boom tool may be used to scrape the sidewalls of the furnace to remove the corundum growth. During the scraping process, it is quite common to pull the corundum away from the wall and also to pull out chunks of refractory. This operation reduces the thickness of the refractory wall, and this in turn decreases the lifetime of the refractory wall. This is also an energy consuming process due to the fact that heat must be put into the furnace during this operation in order to maintain the molten metal temperature at about 1200° F. to about 1500° F. (about 649° C. to about 816° C.). The problem therefore is to prevent or reduce the growth of corundum. By use of the inventive mortar and coating compositions it is possible to prevent or reduce the formation of the corundum growth due, at least in part, to the fact that the mortar and coating compositions are free of $SiO_2$ or substantially free of $SiO_2$. This in turn will reduce the amount of furnace sidewall scraping maintenance that will be required.

For steel applications, the processing temperatures are typically higher than for aluminum processing. Steel processing temperatures are typically in the range from about 2800° F. to about 3200° F. (about 1538° C. to about 1760° C.). At these higher temperatures and in the presence of corrosive steel alloys, the refractory lifetimes are often very short, for example, on the order of no more than several days or hours. The $SiO_2$ content of the refractories for steel applications is also a source of undesirable reactions which may lead to the deterioration of the refractory. Use of the inventive mortar and coating compositions, which are free or substantially free of $SiO_2$, is advantageous for these refractories.

The ceramic refractory particulates used in making the inventive mortar and coating compositions may be made from an as-batched composition comprising alumina particulates, one or more rare earth oxides, and one or more oxides of a transitional metal, the transition metal being Sc, Zn, Ga, Y, Cd, In, Sn, Tl or a mixture of two or more thereof. The as-batched composition may further comprise as a reinforcing material chopped ceramic fibers containing nanofibrils, alumina fibers, or a mixture thereof. The as-batched composition may be molded, dried and fired to make a ceramic refractory, which may then be ground to make the ceramic refractory particulates. The term "as-batched" refers to the composition used to make the refractory prior to firing. The as-batched composition as well as the refractory made from it may be free of $SiO_2$ or substantially free of $SiO_2$. The concentration of $SiO_2$ may be less than a trace amount.

The alumina particulates may comprise a mixture of dehydrated boehmite and calcined boehmite. The weight ratio of dehydrated boehmite to calcined boehmite may be in the range from about 10:90 to about 50:50, and in one embodiment in the range from about 20:80 to about 30:70. The alumina particulates may have a mean particle size in the range from about 1 to about 4 microns, and in one embodiment in the range from about 1.7 to about 2.5 microns. The concentration of alumina particulates in the as-batched composition used to form the ceramic refractory for making the ceramic refractory particulates may be in the range from about 10 to about 80% by weight, and in one embodiment in the range from about 40 to about 60% by weight.

The rare earth oxide may be an oxide of Pr, La, Ce, Nd, Pm, Sm, Eu, Gd, Tb, Dy, Ho, Er, Tm, Yb, Lu, or a mixture of two or more thereof. Pr may be especially useful. The rare earth oxide as introduced into the as-batched composition used for making ceramic refractory particulates may comprise $Pr_6O_{11}$. The rare earth oxide may function as a non-wetting agent and may be employed at an effective concentration to function as a refractory enhancer. The rare earth oxide introduced into the as-batched composition used to make the ceramic refractory particulates may be in the form of solid particulates. These particulates may have a mean particle size in the range from about 0.1 to about 10 microns, and in one embodiment in the range from about 1 to about 7.5 microns. The concentration of rare earth oxide particulates in the as-batched composition used for making ceramic refractory particulates may be in the range from about 2 to about 20% by weight, and in one embodiment in the range from about 6 to about 12% by weight. The concentration of the rare earth element in the ceramic refractory particulates may be in the range from about 0.1 to about 40% by weight, and in one embodiment in the range from about 1 to about 30% by weight, and in one embodiment in the range from about 3 to about 20% by weight, and in one embodiment in the range from about 6 to about 14% by weight.

As indicated above, the transition metal may comprise Sc, Zn, Ga, Y, Cd, In, Sn, Tl, or a mixture of two or more thereof. Y may be especially useful. The transition metal oxide as introduced into the as-batched composition used for making ceramic refractory particulates may comprise $Y_2O_3$. The transition metal oxide may function as a binding agent. The concentration of the transition metal in the ceramic refractory particulates may be an effective amount to function as a binding agent. The transition metal oxide introduced into the as-batched composition used to make the ceramic refractory particulates may be in the form of solid particulates. These particulates may have a mean particle size in the range from about 0.1 to about 10 microns, and in one embodiment in the range from about 1.0 to about 2.5 microns. The concentration of transition metal oxide particulates in the as-batched composition used to form the ceramic refractory particulates may be in the range from about 0.01 to about 10% by weight, and in one embodiment in the range from about 0.1 to about 5% by weight, and in one embodiment in the range from about 0.2 to about 2%, and in one embodiment in the range from about 0.4 to about 0.8% by weight. The concentration of the transition metal in the ceramic refractory particulates may be in the range from about 0.01 to about 20% by weight, and in one embodiment in the range from about 0.01 to about 10% by weight, and in one embodiment in the range from about 0.05 to about 5% by weight, and in one embodiment in the range from about 0.1 to about 2% by weight.

When the ceramic refractory particulates are made using the chopped ceramic fibers containing nanofibrils, the process for making the ceramic refractory used in making the ceramic refractory particulates may comprise wetting chopped ceramic fibers with an acidic solution for an effective period of time to form wetted chopped ceramic fibers containing nanofibrils; mixing the wetted chopped ceramic fibers with alumina particulates, particulates of the one or more transition metal oxides, particulates of the one or more rare earth oxides and, optionally, alumina aggregate, to form an as-batched composition; molding the as-batched composition; drying the as-batched composition; and then firing the as-batched composition at a sufficient temperature and for an effective period of time to form the ceramic refractory, which is then ground to form the ceramic refractory particulates.

The chopped ceramic fibers may comprise strands of ceramic fiber that are chopped to median lengths in the range from about 0.1 to about 5 cm, and in one embodiment in the range from about 0.3 to about 4 cm. The chopped ceramic fibers may have median diameters in the range from about 1 to about 50 microns, and in one embodiment from about 1 to about 30 microns, and in one embodiment in the range from about 1 to about 20 microns, and in one embodiment in the range from about 3 to about 15 microns, and in one embodiment in the range from about 7 to about 13 microns, and in one embodiment about 10 microns. The chopped ceramic fibers may have an alumina content of at least about 95% by weight, and in one embodiment at least about 97% by weight, and in one embodiment at least about 99% by weight. The alumina may comprise alpha-alumina, gamma-alumina, eta-alumina, rho-alumina, delta-alumina, theta-alumina, or a mixture of two or more thereof. The chopped ceramic fibers may have a concentration of gamma alumina crystallinity of at least about 50% by weight, and in one embodiment in the range from about 50 to about 99.9% by weight, and a concentration of alpha alumina crystallinity that is up to about 5% by weight, and in one embodiment in the range from about 0.1 to about 5% by weight. Upon firing the alumina that is not alpha-alumina may convert to alpha-alumina.

The chopped ceramic fibers may be wetted with an acidic solution for an effective period of time to provide for the desired level of nanofibril formation on the surface of the chopped fibers. The acidic solution may comprise a protonic acid such as $HNO_3$ and distilled water. The acidic solution may further comprise one or more dispersing agents. An example of a useful dispersing agent may be Darvan C which is a product of R.T. Vanderbilt identified as an ammonium polymethacrylate dispersing agent. The acidic solution may have an acid concentration in the range from about 0.1 to about 4% by weight, and in one embodiment from about 2.8 to about 3.2% by weight. The acidic solution may contain from about 0.01 to about 2% by weight dispersing agent, and in one embodiment from about 0.4 to about 0.8% by weight dispersing agent. The wetted fibers may be formed by contacting the chopped ceramic fibers with the acidic solution using any suitable contacting method including dripping, spraying, dipping, immersing, and the like. The contacting may be effected over a period in the range from about 1 to about 100 minutes, and in one embodiment from about 40 to about 60 minutes.

While not wishing to be bound by theory, it is believed the wetting of the chopped ceramic fibers with the acidic solution causes the ceramic fibers to fray resulting in the formation of the nanofibrils. The nanofibrils may extend from the surface of the chopped ceramic fibers. The nanofibrils may have mean lengths in the range from about 1 to about 10,000 nanometers (nm), and in one embodiment in the range from about 100 to about 1000 nm. The nanofibrils may have mean diameters in the range from about 0.1 to about 2000 nm, and in one embodiment in the range from about 10 to about 200 nm. The number of nanofibrils on the surface of ceramic fibers may be in the range from about 1 to about 500 per square micron of or surface area of fiber, and in one embodiment from about 50 to about 180 per square micron. The nanofibrils may extend the surface area of the chopped ceramic fibers by at least about 100 times as compared to the surface area of the chopped ceramic fiber without the nanofibrils, and in one embodiment by at least about 1000 times, and in one embodiment by at least about 10,000 times, as compared to the surface area of the chopped ceramic fibers without the nanofibrils. It is believed that the nanofibrils provide an increased surface area for the chopped ceramic fibers which in turn provides enhanced bonding between the fibers and the alumina, transition metal oxide, and rare earth oxide.

The concentration of wetted ceramic fibers in the as-batched composition used to form the ceramic refractory particulates may be in the range from about 0.1 to about 50% by weight, and in one embodiment in the range from about 5 to about 50% by weight, and in one embodiment in the range from about 10 to about 40% by weight, and in one embodiment in the range from about 20 to about 30% by weight.

When the alumina fibers are used as the reinforcing material, it is not necessary to employ the wetting procedure described above for use in forming the nanofibrils on the chopped ceramic fibers. As such, the process for making the ceramic refractory used in making the ceramic refractory particulates may comprise mixing the alumina fibers with the alumina particulates, particulates of the one or more transition metal oxides, particulates of the one or more rare earth oxides and, optionally, alumina aggregate, to form an as-batched composition; molding the as-batched composition; drying the as-batched composition; and then firing the as-batched composition at a sufficient temperature and for an effective period of time to form the ceramic refractory, which is then ground to form the ceramic refractory particulates.

The alumina fibers may comprise high surface area alumina fibers. These alumina fibers may have a surface area in the range from about 50 to about 500 square meters per gram ($m^2/g$), and in one embodiment in the range from about 150 to about 200 ($m^2/g$). These alumina fibers may comprise amorphous alumina, crystalline alumina, or a mixture thereof. The alumina fibers may have an amorphous alumina content of about 30% to about 70% by weight, and in one embodiment about 50% by weight; and a crystalline alumina content of about 30% to about 70% by weight, and in one embodiment about 50% by weight. These fibers may have a pore volume in the range from about 1800 to about 2200 cubic centimeters per gram ($cm^3/g$), and in one embodiment about 2000 $cm^3/g$. These fibers may have a tensile strength in the range from about 800 to about 1200 MPa, and in one embodiment about 1000 MPa. These fibers may have a Young's modulus in the range from about 80 to about 120 GPa, and in one embodiment about 100 GPa. The fiber diameter may be in the range from about 1 to about 5 microns, and in one embodiment in the range from about 3 to about 3.5 microns. These fibers may have median lengths in the range from about 0.1 to about 5 cm, and in one embodiment from about 0.3 to about 4 cm. The concentration the alumina fibers in the as-batched composition used to form the ceramic refractory for making the ceramic refractory particulates may be in the range from about 0.1 to about 50% by weight, and in one embodiment in the range from about 5 to about 50% by weight, and in one embodiment in the range from about 10 to about 40% by weight, and in one embodiment in the range from about 20 to about 30% by weight. An example of an alumina fiber that may be used is available from Saffil under the tradename CG Mat Fibre or CG Grade Mat. The fibers may comprise strips of this CG Grade Mat, the strips having the dimensions of about ⅛ inch (0.3175 cm) wide and about 1.5 inches (3.81 cm) long.

Mixtures of the chopped ceramic fibers and alumina fibers may be used in the as-batched composition to form the ceramic refractory used to make the ceramic refractory particulates. The weight ratio of chopped ceramic fibers to alumina fibers may be in the range from about 90:10 to about 10:90, and in one embodiment from about 70:30 to about 30:70.

The use of the alumina aggregate for forming the ceramic refractory for making the ceramic refractory particulates is optional but when used the alumina aggregate may aid in shrink control as well as provide enhanced physical and performance properties. The alumina aggregate may have a particle size in the −28 and +325 mesh size range. The expression "−28 and +325 mesh size" is used herein to refer to the fact that the particulates are of a sufficient size to flow through a screen with a 28 mesh size but be retained on a screen with a 325 mesh size. Particle size ranges within the foregoing range may be used. These may include the −28 and +65 range, and the −65 and +325 range. The alumina aggregate may comprise alpha-alumina, gamma-alumina, eta-alumina, rho-alumina, delta-alumina, theta-alumina, or a mixture of two or more thereof. Upon firing the alumina that is not alpha-alumina may convert to alpha-alumina. The concentration of alumina aggregate in the as-batched composition used to form the ceramic refractory for making the ceramic refractory particulates may be up to about 99% by weight, and in one embodiment in the range from about 1 to about 99% by weight, and in one embodiment in the range from about 5 to about 80% by weight, and in one embodiment in the range from about 5 to about 50% by weight, and in one embodiment in the range from about 5 to about 35% by weight.

The as-batched composition used to form the ceramic refractory for making the ceramic refractory particulates may be mixed using appropriate mixing techniques until a uniform mixture is obtained. The as-batched composition may then be placed in a mold with a desired shape and dried at a temperature in the range from about 40 to about 90° C., and in one embodiment in the range from about 65 to about 80° C., for a period of time in the range from about 1 to about 30 hours, and in one embodiment for about 16 to about 20 hours. The resulting molded composition may be removed from the mold and, optionally, further dried at a temperature in the range from about 100 to about 300° C., and in one embodiment from about 200 to about 240° C., for a period of time in the range from about 10 to about 44 hours, and in one embodiment in the range from about 18 to about 22 hours.

The as-batched molded refractory composition may be fired using the following procedure: (1) heating the as-batched molded composition from a temperature of about 25° C. to about 1450° C. at a rate of about 5° C. per minute over a period of about 270 to about 300 minutes, and in one embodiment about 285 minutes; (2) increasing the temperature from about 1450° C. to about 1550° C. at a rate of about 2° C. per minute over a period of about 40 to about 60 minutes, and in one embodiment about 50 minutes; (3) increasing the temperature from about 1550° C. to about 1650° C. at a rate of about 1° C. per minute over a period of about 80 to about 120 minutes, and in one embodiment bout 100 minutes; (4) increasing the temperature from about 1650° C. to about 1700° C. at a rate of about 0.5° C. per minute over a period of about 80 to about 120 minutes, and in one embodiment about 100 minutes, (5) holding the temperature at about 1700° C. for about 50 to about 70 minutes, and in one embodiment about 60 minutes; and (6) reducing the temperature from about 1700° C. to about 25° C. over a period of about 700 to about 900 minutes, and in one embodiment about 800 minutes. The firing procedure may be referred to as a sintering procedure.

The firing procedure for making the ceramic refractory used for making the ceramic refractory particulates may comprise: (1) heating the as-batched molded composition from about 25° C. to about 1450° C. at a rate of about 120° C. per hour over a period of about 11 to about 12 hours; (2) increasing the temperature from about 1450° C. to about 1550° C. at a rate of about 80° C. per hour over a period of about 1 to about 1.5 hours; (3) increasing the temperature from about 1550° C. to about 1650° C. at a rate of about 60° C. per hour for about 1.5 to about 2 hours; (4) increasing the temperature from about 1650° C. to about 1700° C. at a rate of about 20° C. per hour over a period of about 2 to about 3 hours; (5) holding the temperature at about 1700° C. for about 0.5 to about 1.5 hours; and (6) reducing the temperature from about 1700° C. to about 25° C. over a period of about 23 to about 24 hours.

The following Examples 1-7 are examples of ceramic refractories that may be ground to particulate form and used in forming the inventive mortar and coating compositions. The refractories are made using the as-batched compositions shown in Table 1 and the procedure discussed below.

TABLE 1

| Example | 1 | 2 | 3 | 4 | 5 | 6 | 7 |
|---|---|---|---|---|---|---|---|
| Almatis Alpha bond 300 | 18.03 | 18.18 | 18.18 | 18.18 | 18.18 | 18.18 | 18.18 |
| Almatis A1000SG | 46.97 | 43.62 | 8.72 | 15.39 | 14.54 | 8.72 | 11.56 |
| $Pr_6O_{11}$ | 6.67 | 7.31 | 7.31 | 7.31 | 7.31 | 7.31 | 7.31 |
| $Y_2O_3$ | 0.33 | 0.36 | 0.36 | 0.36 | 0.36 | 0.36 | 0.36 |
| Nextel XN740 Fiber | 28.00 | 30.53 | 30.53 | 28.00 | 28.00 | 28.00 | 28.0 |
| Alumina Aggregate | — | — | 34.90 | 30.76 | 31.61 | 37.43 | 34.59 |

Almatis Alphabond 300 is a product of Almatis, which is in the form of particulate solids, and is identified as being a binder containing about 88% by weight aluminum oxide. The aluminum oxide is believed to be in the form of dehydrated boehmite. The particulate solids are ground to a median particle size of 4-8 microns.

Almatis A1000SG is a product of Almatis, which is in the form of particulate solids, and is identified as being calcined boehmite. These particulate solids are ground to a median particle size of 1.5 microns.

$Pr_6O_{11}$ is in the form of particulate solids. These particulate solids are ground to a median particle size of 2.5 microns.

$Y_2O_3$ is in the form of particulate solids. These particulate solids are ground to a median particle size of 1.2 microns.

Nextel XN 740 Fibers are chopped ceramic fibers supplied by 3M. These fibers have an $Al_2O_3$ content that is in excess of 99% by weight, a level of gamma crystallinity in excess of 50% by weight, and a level of alpha crystallinity that is less than 5% by weight. The fibers have median diameters of 7-13 microns.

The alumina aggregate for Example 3 contributes 28.36% by weight with a −325 mesh size and 6.54% by weight with a −65 mesh size. The alumina aggregate for Example 4 contributes 15.38% by weight with a −325 mesh size and 15.38% by weight with a −65 mesh size. The alumina aggregate for Example 5 contributes 14.54% by weight with a −325 mesh size, 14.54% by weight with a −65 mesh size and 2.53% by weight with a −28 mesh size. The Alumina Aggregate for Example 6 contributes 6.54% by weight with a −325 mesh size, 28.36% by weight with a −65 mesh size and 2.53% by weight with a −28 mesh size. The Alumina Aggregate for Example 7 contributes 11.53% by weight with a −325 mesh size, 11.53% by weight with a −65 mesh size and 11.53% by weight with a −28 mesh size.

The ceramic refractories of Examples 1-7 are prepared using the following eight-part procedure.

Part 1. The Nextel XN 740 fibers are fluffed for 75 seconds and then wetted by dripping an aqueous mixture containing 95.54% by weight distilled water, 3.82% by weight nitric acid and 0.64% by weight Darvan C on to the fibers to form wetted fibers.

Part 2. Add half the Almatis Alphabond 300, half the Almatis A1000SG, and all of the $Pr_6O_{11}$, $Y_2O_3$ and the alumina aggregate to an Eirich mixer. Mix for 5 minutes at 20 Hz. Stop and scrape the mixer drum and sides. Mix for 5 more minutes at 20 Hz.

Part 3. The wetted fibers From Part 1 are added to the mixture of particulate solids from Part 2 over a period of 20 minutes with mixing. After the addition of the wetted fibers is complete, the overall mixture is mixed for an additional 5 minutes.

Part 4. The remainder of the Almatis Alphabond 300 and the Almatis A 1000SG is added to the mixture from Part 3. The resulting mixture is mixed for 2-5 minutes. The mixture is placed in molds to form molded parts.

Part 5. The molded parts are covered for with a plastic bag for at least eight hours.

Part 6. The plastic bag is removed and the molded parts are allowed to air-dry in the mold.

Part 7. The molded parts are removed from the mold and allowed to air-dry before being placed in a dryer at 107° C. The molded parts are left in the dryer until the weight loss has reached 12.1% by weight.

Part 8. The molded parts are fired, the firing process involving the steps of (1) heating the molded parts from a temperature of 25° C. to 1450° C. at a rate of 5° C. per minute over a period of 285 minutes, (2) heating from 1450° C. to 1550° C. at a rate of 2° C. per minute over a period of 50 minutes, (3) heating from 1550° C. to 1650° at a rate of 1° C. per minute over a period of about 100 minutes, (4) heating from 1650° C. to 1700° C. at a rate of 0.5° C. per minute over a period of 100 minutes, (5) holding the temperature constant at 1700° C. for about 60 minutes, and (6) cooling from 1700° C. to 25° C. over a period of 800 minutes.

The ceramic refractory particulates used in the inventive mortar and coating compositions may be made from the above-described ceramic refractory by breaking blocks of the ceramic refractory into pieces and then subsequently grinding the pieces to produce fine particulates. If the broken pieces of ceramic refractory are large, they may be processed through a chipmunk mill to obtain particle sizes that can be accepted by a jet-mill. A fluidized bed jet mill may be used to reduce the particle size of the ceramic refractory to less than a 100 mesh screen or less than about 150 microns. The use of the fluidized bed jet mill may be advantageous for providing tight, repeatable particle size control and to provide contamination-free processing.

The particle size of the ceramic refractory particulates may be up to about 150 microns, and in one embodiment up to about 100 microns, and in one embodiment up to about 75 microns. The particle size distribution of the ceramic refractory particulates may comprise about 90% by volume less than about 65 microns, about 50% less than about 16 microns, and about 10% less than about 3.6 microns. Alternatively, the particulate size distribution may comprise about 90% by volume less than about 31 microns, about 50% less than about 11 microns, and about 10% less than 2.9 microns.

In one embodiment, no chopped ceramic fibers or alumina fibers are required for making the ceramic refractory particulates. In this embodiment, the alumina, rare earth oxide and transition metal oxide particulates may be mixed, for example, in a Hobart mixer. The particulate mixture may then be subjected to a pelletizing or briquetting procedure. The pellets or briquets may then be fired through a shaft kiln to about 1700° C. The ceramic refractory material coming out of the shaft kiln may then be reduced in particle size to less than about 150 microns by jet-milling to make the desired ceramic refractory particulates.

Alternatively, the ceramic refractory particulates may be made by mixing the particulate solids (i.e., alumina particulates, rare earth oxide particulates and transition metal oxide particulates) in an Eirich mixer, and instead of consolidating the mix coming out of the Eirich mixer into a solid structure such as a formed ceramic part, the pellets coming out of the Eirich mixer may be fired in a high temperature furnace to about 1700° C. The high temperature furnace may be a shaft kiln or setters in a conventional furnace that hold the Eirich mixed pellets. The pellets may then be reduced in size in a jet-mill to form the desired ceramic refractory particulates. An advantage of sending pellets to the jet-mill for particle size reduction is that less energy and time may be required to achieve the desired fine particle size distribution.

The phosphate and alumina containing composition may comprise an alumina adhesive or a phosphate-bonded alumina coating system. The phosphate and alumina containing composition may comprise an aluminum phosphate such as monoaluminum phosphate. The phosphate and alumina containing composition may comprise a a mixture of alumina particulates and monoaluminum phosphate. The alumina particulates may have a particle size in the range from about 0.2 to about 90 microns, and in one embodiment from about 1 to about 45 microns. The weight ratio of the alumina particulates to monoaluminum phosphate may be in the range from about 4:1 to about 2:2. Examples of useful phosphate and alumina containing compositions that may be used may include Pyro-Paint 634-ALP which is available from Aremco Products, Inc, and is identified as a phosphate-bonded alumina coating system; and Resbond 903HP which is available from Cotronics Corp., and is identified as high temperature alumina adhesive for bonding dense high strength ceramics.

The water used in the inventive mortar and coating compositions may be obtained from any source. Distilled water may be especially useful.

The inventive mortar and coating compositions may comprise: from about 10 to about 35% by weight of the ceramic refractory particulates, and in one embodiment from about 25 to about 33% by weight the ceramic refractory particulates; from about 50 to about 85% by weight of the phosphate-bonded alumina, and in one embodiment from about 55 to about 65% by weight of the phosphate bonded alumina; and from about 5 to about 15% by weight water, and in one embodiment from about 5.5 to about 14.5% by weight water.

The inventive mortar and coating compositions may contain additional amounts of the above-described rare earth oxide particulates, for example, $Pr_6O_{11}$. The mortar and coating compositions may contain as an additional amount of the rare earth oxide particulates from about 0.1 to about 6% by weight of such rare earth oxides, and in one embodiment from about 1 to about 5% by weight of such rare earth oxide particulates.

Formulations for making the inventive mortar and coating compositions are shown below in the following Table 2 wherein all numerical values are in percent by weight. Examples 8-10 are for mortar compositions. Example 11 is for a coating composition. The coating composition may be used to repair a used refractory or coat refractory that has not yet been placed in service.

TABLE 2

| Example | 8 | 9 | 10 | 11 |
|---|---|---|---|---|
| Cotronics Resbond 903 HP | 62.97 | 59.82 | 77.00 | 57.14 |
| Ceramic particulates (−100 mesh) from Example 4 | 31.29 | 29.72 | 14.70 | 28.57 |

TABLE 2-continued

| Example | 8 | 9 | 10 | 11 |
|---|---|---|---|---|
| Distilled water | 5.74 | 5.63 | 8.30 | 14.29 |
| $Pr_6O_{11}$ | | 5.00 | | |

The density of the mortar composition of Example 8 is 2.53 g/cc. The density of the coating composition of Example 11 is 2.23 g/cc.

In an alternate embodiment, the inventive mortar and coating composition may be made by combining: the above-described ceramic refractory particulates, an aluminum phosphate solution, and optionally the above-described alumina particulates (in addition to the alumina particulates used in making the ceramic refractory particulates). The aluminum phosphate solution may comprise a monoaluminum phosphate solution. An example of a monoalumium phosphate solution that may be used is available from Innophos, Inc. under the tradename Monoalumium Phosphate 50% Solution Technical Grade. The composition may be free of $S_iO_2$, or substantially free of $S_iO_2$. The ceramic refractory particulates and the alumina particulates may have particle sizes in the range from about 0.1 to about 250 microns, and in one embodiment from about 5 to about 75 microns. The aluminum phosphate solution may comprise a mixture of phosphoric acid and aluminum salt at a weight ratio of, for example, about 3:1. The aluminum phosphate solution may comprise from about 50 to about 70 wt % phosphoric acid, from about 5 to about 25 wt. % alumina, and from about 15 to about 35 wt % water. The mortar and coating composition may comprise: from about 15 to 80 by weight ceramic refractory particulates; up to about 65% by weight alumina particulates; and from about 20 to about 45% monoalumium phosphate solution.

The inventive mortar or coating composition may be applied to a refractory substrate using trowelling, brushing and/or spraying on to the refractory substrate. This may be followed by a two step cure cycle wherein the applied mortar or coating is heated to a temperature in the range from about 100° C. to about 150° C., and in one embodiment about 120° C., held at that temperature for about two hours, then heated to a temperature in the range from about 370° C. to about 430° C., and held at that temperature for about four hours. The cured mortar or coating is then fired to a top temperature which is appropriate for the end use application. For example, typically for an aluminum metal application the cured mortar or coating may be fired to about 815° C. and for a steel application the top temperature may be as high as about 1700° C.

In general, alumina containing refractories and castables with thermal expansions that are not too dissimilar from that of the inventive mortar or coating compositions may be treated with the inventive mortar or coating compositions. Commercial refractories that may be treated with the inventive mortar or coating composition may include: Greenpak-85-MP Plus (80% alumina phosphate-bonded plastic); HP-CAST 94MA-C (94.1% high-purity alumina, spinel-containing, ultra-low cement, coarse castable); Resco Quikturn 65PCA (65% alumina low cement castable for aluminum contact); Greenlite 45L AL Plus (45% alumina insulating castable for aluminum contact); Korundal XD (90.2% high alumina brick); WAM ALIT (66.3% alumina standard cement castable for aluminum contact); Phantom XL127 (82% magnesia and 11% fixed carbon brick); and the like.

Example 8

A mortar composition is made by mixing 13.2 lb. of Resbond 903HP, 6.6 lbs. of ground ceramic refractory from Example 4 (−100 mesh), and 1.2 lb. of distilled water in a KitchenAid mixer with a dough blade.

Example 9

A coating coat composition is made by mixing 10.63 lb. of Resbond 903HP, 5.31 lbs. of ground ceramic refractory from Example 4 (−100 mesh), and 2.66 lb. of distilled water with a mortar stirrer powered by an electric drill operating at approximately 1000 RPM. The electric drill is a DeWalt Model D21008 variable speed hand drill capable operating over the range from 0 to 2500 RPM.

Example 10

A sample of the coating composition from Example 9 is analyzed for determination of particle size distribution using a Microtrac-SRA150. The particle size distribution is 90% less than 37 microns, 50% less than 10.1 microns, and 10% less than 3.2 microns Example 11

A sample of the coating composition from Example 9 is used to perform a spray trial. The test is performed using a Binks Model 26 spray gun operating at 50 psi. The Binks spray gun is a conventional siphon fed air assisted spray gun. The substrate used for the test is a sheet of cardboard. The coating composition is applied to the cardboard substrate in an amount that covers the substrate surface but does not produce runs or drips. The coating composition coverage is 0.110 lb/ft$^2$. Using the density of the coating composition, which is 2.23 g/cc, the coating thickness is calculated. Physical chips of the sprayed coating composition are removed from the cardboard and are measured for thickness. The physical chip thickness is 4 to 8 mils, which is in agreement with the calculated thickness of 9 mils. The coating composition is suitable for use in a standard spray gun system.

Example 12

A steel ladle refractory in the form of a high-purity alumina, spinel-containing, ultra-low cement coarse castable, is provided in the form of a test brick measuring 5×2×2 inches (12.7×5.08×5.08 cm) and fired to 1500° F. (816° C.). The coating composition of Example 9 is applied to the surface of the castable brick by brushing with a paint brush. The applied coat is approximately 11 mils (0.28 mm) thick for a coating coverage of 146 ft$^2$/gallon. The high-purity alumina castable brick is fired to 3092° F. (1700° C.) after application of the coating composition. The coated brick is immersed in a molten bath of tool steel having a composition of 0.55 wt. % carbon, 0.73% chromium, 0.25 wt % manganese, 0.22 wt % molybdenum, 0.15 wt. % nickel and minor amounts of phosphorus, silicon, sulfur and vanadium, with the balance of the alloy being iron. The temperature of the molten bath of tool steel is 2860° F. (1571° C.). The test sample is left in the molten tool steel bath for fifteen minutes after which the sample is pulled out of the bath and allowed to cool to room temperature. The coating composition acts as a release agent for the molten tool steel alloy. Below the metal line there is no metal penetration and the solidified steel flakes can be popped off the test brick exposing the unreacted surface of the test brick.

Example 13

The strength of mortar joints is determined at room temperature and after firing the mortared brick joints to 1500° F.

(815° C.) using the procedure in ASTM C-198. Mortar joints of troweling consistency are made on high alumina brick using the mortar from Example 8. All fractures occur at the mortar/brick interface. The modules of rupture (MOR) after 220° F. (105° C.) is 190-515 lb/in$^2$ (1.3-3.5 MPa). The MOR after 1500° F. (815° C.) is 350-1450 lb/in$^2$ (2.4-10.0 MPa). The mortar of Example 8 shows an increase in strength with firing at higher temperatures. MOR values of 1416 and 1448 psi for the mortar of Example 8 after firing to 1500° F. (815° C.) are obtained. These MOR values for the praseodymium containing mortar of Example 8 are compared to a high alumina phosphate-bonded mortar which is fired to 1500° F. (815° C.). The average MOR value for 5 bars of high alumina phosphate-bonded mortar is 817 lb/in$^2$ (5.6 MPa). With higher firing temperatures the strength of the mortar from Example 8 increases.

Example 14

The non-reactivity of the mortar of Example 8 is determined with a 72 Hour Alcoa Mortar Cup Test. A brick sample is sawed through the center longitudinally. The halves are cemented together with the mortar using spacers to obtain a ¼ inch (0.635 cm) thick joint. The joint thickness is exaggerated over that which would be normally used in order to permit easy examination of metal attack. The mortared cup is permitted to air dry for 16 hours and is then fired at a rate of 50° F./hr. (10° C./hr) to 1500° F. (816° C.), held for 10 hours, furnace cooled and examined for integrity. It is then subjected to the same procedure as in the 72 hour brick cup test and is additionally examined for mortar joint integrity. Metal analysis from the mortar cup test is then compared with the one without the mortar joint to determine level of pickup or loss of other specific elements.

The maximum allowable pick-up for silicon and iron during the 72 Hour Alcoa Cup Test is 0.5% and 0.1%, respectively. The pick-up for silicon and iron for the Cup Test shown in FIG. 1 with the mortar joint using the mortar of Example 8 is 0.019% for silicon and 0.00% for iron. The Mortar Cup Test involves elemental pick-up from the brick and from the mortar. The silicon pick-up for just the mortar joint is determined by subtracting the silicon pick-up of the brick at 0.001 from the silicon pick-up of the brick and mortar cup test of 0.018%. This is an extremely low and almost negligible pick-up of silicon. The mortar is extremely pure and suitable for aluminum contact applications.

Example 15

Figure 2:
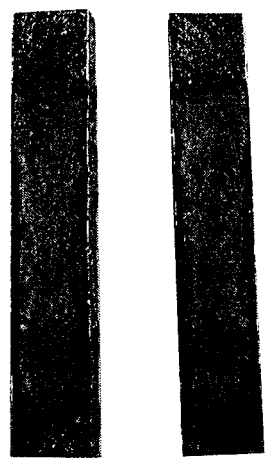
FIG. 2 shows two pieces of the brick sample described in Example 15.

A high alumina brick having a composition of 90.2% alumina and 9.6% silica is cut into a 1×1×6 inch (2.54×2.54×15.24 cm) sample. Four sides and the bottom of the sample are coated with the coating composition from Example 9. A one inch (2.54 cm) section at the top of the sample is uncoated. The coating composition is applied to the high alumina brick using a brush. The coating thickness is 15 mils (0.381 mm). The coating composition is subjected to a curing cycle of two hours at 250° F. (120° C.) followed by four hours at 750° F. (371° C.). The sample is fired to 1500° F. (615° C.) with a one hour hold at the top temperature. The brick with the applied coating composition is held with a metal fixture at the top of the sample where there is no coating and rotates in a crucible holding a molten 7075 aluminum alloy for 46 hours. At the end of the test, when removing the sample from the metal fixture, the sample falls into the molten metal bath and is completely immersed in the molten 7075 alloy. The sample is retrieved from the molten metal bath and sectioned into two pieces as shown in FIG. 2. As can be seen in FIG. 2, the coating composition retardeds the reaction zone into the high alumina brick. The center of the brick sample is unreacted. The top one inch (2.54 cm) of the sample, which is not coated with the coating composition, is dark colored and metal infiltrated. The coating composition retards the reaction penetration zone of the molten 7075 alloy in contact with the coated high alumina brick.

Example 16

A sample of the mortar from Example 8 is troweled onto a basic carbon-magnesia steel ladle brick having a composition of 82% MgO and 11% fixed carbon. The mortar is self-leveling. With vibration it flows to form a continuous smooth layer. The mortar coated basic carbon-magnesia steel ladle brick is cured using a two step cure of two hours at 250° F. (120° C.) followed by four hours at 750° F. (371° C.). The sample is fired to 1500° F. (815° C.) with a one hour hold at top temperature. The mortar adheres to the basic carbon-magnesia brick.

While the invention has been explained in relation to various embodiments, it is to be understood that modifications thereof may become apparent to those skilled in the art upon reading the specification. Therefore, it is to be understood that the scope of the invention described herein is intended to include all modifications that are within the scope of the appended claims.

The invention claimed is:

1. A composition, comprising:
   an aggregate for addition to mortar made from an as-batched refractory composition which comprises alumina particulates, one or more rare earth oxides, and one or more oxides of a transition metal, the transition metal being Sc, Zn, Ga, Y, Cd, In, Sn, Tl, or the oxide of a transition metal being a mixture of two or more transition metal oxides, the as-batched refractory composition being fired to form a ceramic refractory;
   wherein the as-batched refractory composition for making the aggregate for addition to mortar further comprises chopped ceramic fibers containing nanofibrils, alumina fibers, or a mixture thereof;
   wherein the nanofibrils extend the surface area of the chopped ceramic fibers by at least about 100 times the surface area of the chopped ceramic fiber without the nanofibrils;
   a phosphate and alumina containing composition; and
   water;
   the composition being free of $SiO_2$ or substantially free of $SiO_2$.

2. The composition of claim 1 wherein the ceramic refractory is in the form of a solid structure which is ground to form the aggregate for addition to mortar.

3. The composition of claim 1 wherein the ceramic refractory is in the form of pellets or briquettes which are reduced in size to form the aggregate for addition to mortar.

4. The composition of claim 1 wherein the chopped ceramic fibers comprise strands of ceramic fiber chopped to a median length in the range from about 0.1 to about 5 cm, and having a median diameter in the range from about 1 to about 50 microns.

5. The composition of claim 1 wherein the alumina fibers have a surface area in the range from about 50 to about 500 square meters per gram.

6. The composition of claim 1 wherein the alumina fibers have a median diameter in the range from about 1 to about 5 microns.

7. The composition of claim 1 wherein the alumina fibers comprise amorphous alumina and crystalline alumina.

8. The composition of claim 1 wherein the alumina particulates in the as-batched refractory composition comprise dehydrated boehmite, calcined boehmite, or a mixture thereof.

9. The composition of claim 1 wherein the as-batched refractory composition further comprises alumina aggregate.

10. The composition of claim 1 wherein the rare earth oxide in the as-batched refractory composition comprises an oxide of Pr, La, Ce, Nd, Pm, Sm, Eu, Gd, Tb, Dy, Ho, Er, Tm, Yb, Lu, or a mixture of two or more thereof.

11. The composition of claim 1 wherein the rare earth oxide in the as-batched refractory composition comprises $Pr_6O_{11}$, and the transition metal oxide in the as-batched refractory composition comprises $Y_2O_3$.

12. The composition of claim 1 wherein the aggregate for addition to mortar has an average particulate size in the range up to about 150 microns.

13. The composition of claim 1 wherein the phosphate and alumina containing composition comprises an alumina adhesive.

14. The composition of claim 1 wherein the phosphate and alumina containing composition comprises a phosphate-bonded alumina coating system.

15. The composition of claim 1 wherein the phosphate and alumina containing composition comprises an aluminum phosphate.

16. The composition of claim 1 wherein the phosphate and alumina containing composition comprises monoaluminum phosphate.

17. The composition of claim 1 wherein the phosphate and alumina containing composition comprises alumina particulates and monoaluminum phosphate.

18. The composition of claim 1 wherein the water comprises distilled water.

19. The composition of claim 1 wherein the composition comprises from about 10 to about 35% by weight aggregate for addition to mortar; from about 50 to about 85% by weight of the alumina and phosphate containing composition; and from about 5 to about 15% by weight water.

20. The composition of claim 1 wherein the composition is in the form of a coating composition.

21. The composition of claim 1 wherein the composition is in the form of a mortar composition.

22. A process for treating a refractory comprising applying the composition of claim 1 to a refractory, curing the composition, and firing the cured composition.

23. The process of claim 22 wherein the refractory is used for contacting molten aluminum and the cured composition is fired at a temperature up to about 815° C.

24. The process of claim 22 wherein the refractory is used for contacting molten steel and the cured composition is fired at a temperature up to about 1700° C.

* * * * *